United States Patent
Rose

(10) Patent No.: US 9,552,427 B2
(45) Date of Patent: Jan. 24, 2017

(54) SUGGESTING MEDIA CONTENT BASED ON AN IMAGE CAPTURE

(71) Applicant: Google Inc., Mountain View, CA (US)

(72) Inventor: Robert Brett Rose, Boulder, CO (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/963,386

(22) Filed: Dec. 9, 2015

(65) Prior Publication Data

US 2016/0085872 A1  Mar. 24, 2016

Related U.S. Application Data

(62) Division of application No. 13/774,697, filed on Feb. 22, 2013, now Pat. No. 9,256,637.

(51) Int. Cl.
*G06F 17/30* (2006.01)
*G06K 9/18* (2006.01)

(52) U.S. Cl.
CPC ... *G06F 17/30867* (2013.01); *G06F 17/30265* (2013.01); *G06F 17/30424* (2013.01); *G06K 9/18* (2013.01)

(58) Field of Classification Search
CPC ............. G06F 17/30424; G06F 17/30; G06F 17/30867; G06F 17/30265; G06F 17/00
USPC .................................................. 707/600–899
See application file for complete search history.

(56) References Cited

U.S. PATENT DOCUMENTS

| | | |
|---|---|---|
| 2008/0267504 A1 | 10/2008 | Schloter et al. |
| 2010/0034468 A1 | 2/2010 | Boncyk et al. |
| 2010/0265311 A1 | 10/2010 | Carpenter et al. |
| 2011/0034176 A1 | 2/2011 | Lord et al. |
| 2011/0320317 A1 | 12/2011 | Yuan et al. |
| 2012/0154608 A1* | 6/2012 | Ko .................... G11B 27/034 348/207.11 |
| 2013/0011062 A1 | 1/2013 | Conwell et al. |

FOREIGN PATENT DOCUMENTS

WO  2012162597 A1  11/2012

OTHER PUBLICATIONS

ISR of PCT/US2014/017443 dated Apr. 22, 2014.
(Continued)

*Primary Examiner* — Isaac M Woo
(74) *Attorney, Agent, or Firm* — Morris & Kamlay LLP

(57) ABSTRACT

A method and/or system for suggesting media content based on an image capture may include receiving, from an electronic device, a request for recommendations based on an image capture, wherein the request comprises data associated with the image capture. One or more search objects may be determined based on an analysis of the request. A particular user associated with the electronic device and one or more search interest associated with the particular user may be determined. One or more custom recommendations for the particular user may be determined based on the one or more search objects and/or based on the one or more search interests. Recommendation data comprising the one or more custom recommendations may be sent to the electronic device.

16 Claims, 5 Drawing Sheets

(56) References Cited

OTHER PUBLICATIONS

Liao, et al., "An Intelligent Recommendation Model with a Case Study on u-Tour Taiwan of Historical Momuments and Cultural Heritage", 2010 International Conference on Technologies and Applications of Artificial Intelligence (TAAI), IEEE, Piscataway, NJ, USA, Nov. 18, 2010 (Nov. 18, 2010), pp. 72-79.

Yu, et al., "Research on Personalized Recommendation System Based on Web Mining", 2010 International Conference on E-Business and E-Government (ICEE), Piscataway, NJ, USA, May 7, 2010 (May 7, 2010), pp. 346-349.

* cited by examiner

SUGGESTING MEDIA CONTENT BASED ON AN IMAGE CAPTURE

TECHNICAL FIELD

Aspects of the present application relate to processing digital data and/or media content. More specifically, certain implementations of the present disclosure relate to a method and/or system for suggesting media content based on an image capture.

BACKGROUND

Various types of electronic devices are now commonly utilized. In this regard, electronic devices may include, for example, personal and non-personal devices, mobile and non-mobile devices, communication (wired and/or wireless) devices, general and special purpose devices. Examples of electronic devices may comprise cellular phones, smartphones, tablets, personal computers, laptops and the like. Determining interests of and recommendations for users of such electronic devices is complex and frequently results in recommendations that diverge from the actual interests of the users.

Further limitations and disadvantages of conventional and traditional approaches will become apparent to one of skill in the art, through comparison of such approaches with some aspects of the present method and/or system set forth in the remainder of this disclosure with reference to the drawings.

BRIEF SUMMARY

Method and/or system for suggesting media content based on an image capture, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1:
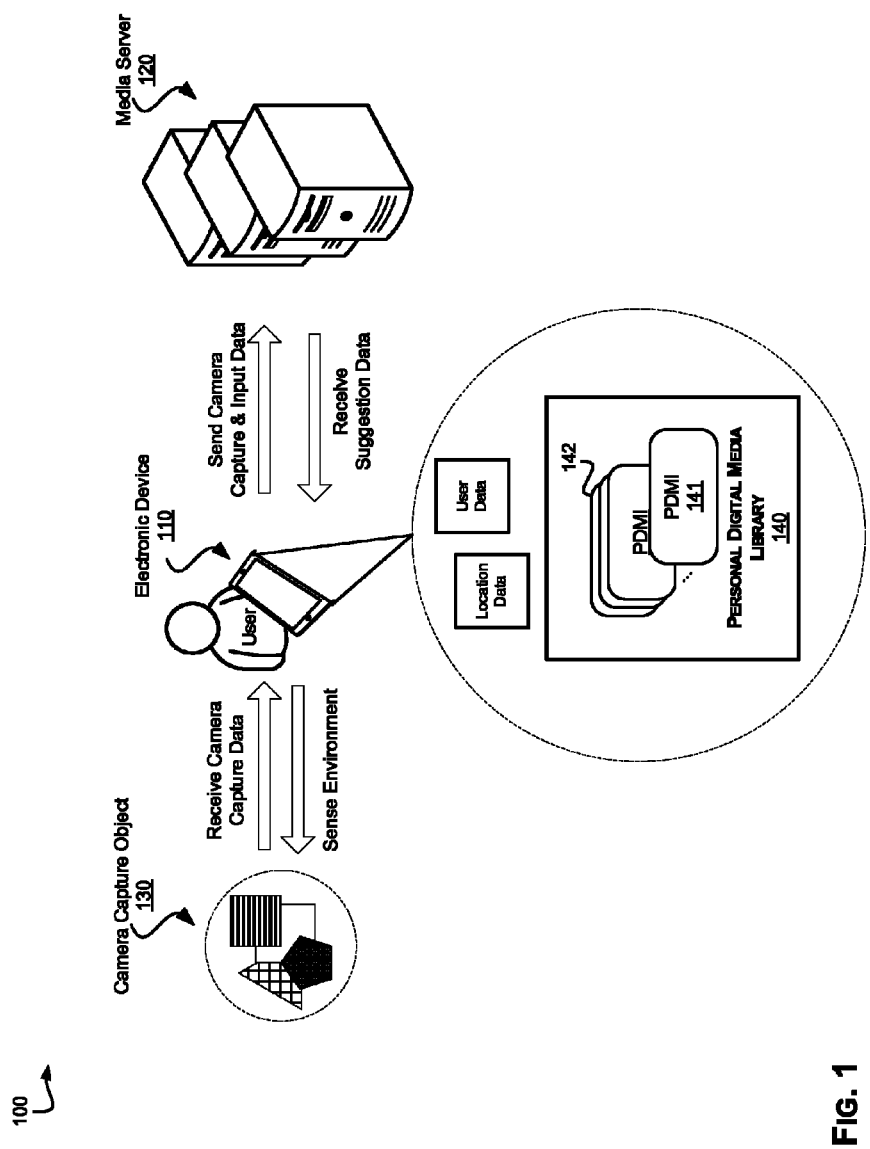
FIG. 1 is a block diagram of an example system for suggesting media content based on an image capture, in accordance with an example embodiment of the disclosure.

Certain embodiments of the disclosure may be found in a method and/or system for suggesting media content based on an image capture. In various embodiments of the disclosure, a method and/or system for suggesting media content based on an image capture may include receiving, from an electronic device, a request for recommendations based on an image capture, wherein the request comprises data associated with the image capture. An analysis of the request may be performed. The analysis may comprise various image processing techniques (e.g., image composition deviation, optical character recognition (OCR), facial recognition, visual search, metadata extraction, etc.).

One or more search objects may be determined based on the analysis of the request. In an example embodiment of the disclosure, a search object may comprise data associated with metadata about the image capture, such as, for example, data indicative of the date, time and/or a location associated with the image capture. In another example embodiment of the disclosure, a search object may be associated with a product (e.g., a digital media item) and/or a service (e.g., concert ticket sales).

A particular user associated with the electronic device, one or more search interests associated with the particular user, and a personal media library associated with the particular user may be determined. One or more search interests may also be determined based on an analysis of the personal digital media library.

In an example embodiment of the disclosure, user data (e.g., demographic data) may be determined and/or received from the electronic device, and one or more search objects may be determined based on the user data. One or more custom recommendations for the particular user may then be determined based on the one or more search objects and/or based on the one or more search interests. Recommendation data comprising the one or more custom recommendations may be sent to the electronic device.

In an example embodiment of the disclosure, a request to open a camera interface may be received on an electronic device through, for example, a user input to the electronic device. A request to capture an image utilizing the camera interface may be received. The image may be stored in a memory of, for example, the electronic device. A request may be sent to a media server for recommendations. The request may comprise data associated with the image. Recommendation data may be received, by the electronic device, from the media server in response to the request. The recommendation data may include custom recommendations, where one or more of the custom recommendations may be based on data associated with the image and/or one or more interests associated with the user. The custom recommendations may be presented to the user.

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "block" refers to functions, processes, threads, etc. than can be performed by one or more circuits. As utilized herein, the term "e.g.," introduces a list of one or more non-limiting examples, instances, or illustrations. As utilized herein, the term "server" may refer to a plurality of machines, at least some of which may be installed in different locations, and each of which may be utilized to implement distinct and/or redundant functions associated with operations attributed to and/or performed by the server.

As used herein the term "digital media" and/or "digital media item" may comprise any discrete media object, such as streaming media, audio files, video files, books, magazines, articles, games, slide shows, camera captures, and the like. Such "digital media" and/or "digital media item" may be operable to be played back, displayed, and/or otherwise rendered for user consumption. The "digital media" and/or "digital media item" may comprise an audio and/or video content and/or any suitable digital media content (e.g., AAC, AC3, AEH (ArchosReader), AVI, BBeB (SonyMedia), Complied HTML, DV, Eveda, Flash, KF8, LIT, MIDI, MobiPocket, MPEG, MP3, MP4, PalmMedia, RealAudio, RealVideo, Shockwave, WaveForm, QuickTime).

As used herein the term "metadata" may comprise information and/or attributes related to digital media and/or an image capture. "Metadata" may comprise various information related to digital media, for example, a name, artist name, album, album artist, compositor, composer, year, genre, disc number, track number, duration, comments, artwork and/or other suitable information and/or attributes. "Metadata" may also comprise various information related to an image capture, for example date, time, location and/or duration.

FIG. 1 is a block diagram of an example system for suggesting media content based on an image capture, in accordance with an example embodiment of the disclosure. Referring to FIG. 1, there is shown a system for suggesting media content based on an image capture 100. The system 100 may comprise an electronic device 110, a media server 120, an image capture object 130 and a personal digital media library (PDML) 140.

The electronic device 110 may comprise suitable logic, circuitry, interfaces, and/or code that may be operable to communicate data and/or messages via wired and/or wireless connections configured in accordance with one or more supported wireless and or wired protocols, standards and/or interfaces (e.g., Ethernet, Bluetooth, WiFi, cellular, WiMAX, WLAN, NFC). The electronic device 110 may be operable to process, generate, present and/or output data and/or messages. The electronic device 110 may be enabled to perform, run, and/or execute various functions, operations, applications and/or programs based on, for example, user instructions and/or interactions, and/or pre-configured instructions. In this regard, the electronic device 110 may be operable to communicate, for example, with the media server 120 and/or the personal digital media library 140.

The electronic device 110 may be operable to perform functions and/or operations and/or to run applications and/or programs.

In an example embodiment of the disclosure, the functions, operations, applications and/or programs may incorporate and/or may be operable to access a personal digital media library, such, as for example, the personal digital media library 140. In this regard the electronic device 110 may be operable to provide the user of the electronic device 110 with access to the personal digital media library 140. The electronic device 110 may be operable to detect user interactions (e.g., playing, purchasing, organizing content) with the PDML 140. In an example embodiment of the disclosure, the electronic device 110 may, in response to, for example, the user interactions with the PDML 140 and/or another application and/or program on the electronic device 110, be operable to request, receive and/or process requests, notifications, data and/or information relating to managing, processing and/or presenting suggestion(s) and/or recommendation(s) based on an image capture.

In another example embodiment of the disclosure, the functions, operations, applications and/or programs may incorporate and/or may be operable to capture, generate and/or process a video and/or a still image. In this regard, the electronic device 110 may, for example, comprise one or more camera devices and/or interfaces (e.g., built-in and/or coupled to the electronic device 110), which may be operable to capture, generate and/or process a video and/or a still image. The functions, operations, applications and/or programs associated with the electronic device 110 may comprise a camera application, which may allow use of and/or user interactions with camera(s). In this regard, the camera application may be implemented as a component (or module) of an operating system running in the electronic device 110 and/or may be implemented as an independent software module, which may be installed in the electronic device 110 (e.g., by a user of the electronic device 110). The camera application may be operable to perform various tasks, functions, and/or operations associated with use of camera(s) in the electronic device 110 (e.g., capturing, generating and/or processing videos and/or still images).

In an example embodiment of the disclosure, the electronic device 110 may be enabled to receive one or more digital media items (DMIs), such as for example, the one or more personal digital media items (PDMIs) 142. The electronic device 110 may be operable to render and/or format the PDMIs 142 for consumption by a user of the electronic device 110. For example, the electronic device 110 may receive, process and/or present the PDMIs 142 to the user as part of services provided by a media server, such as, for example, the media server 120. The electronic device 110 may be operable to play PDMIs 142 through internal and/or external speakers, and/or headsets.

The electronic device 110 may comprise a cellular phone, smartphone, tablet, set-top box, television, laptop computer, desktop and/or personal computer, personal media player, other device which may communicate, process, generate, present and/or output data and/or other device that supports consumption of digital media. The disclosure, and/or any implementation(s) in accordance therewith, however, are not limited to any particular type of electronic devices.

The media server 120 may comprise suitable logic, circuitry, interfaces, and/or code that may be operable to provide digital media services to electronic devices, such as for example, the electronic device 110. For example, the media server 120 may be enabled to provide digital media storage services, digital media management services, subscription services (e.g., streaming digital media subscription services), digital media provisioning services (e.g., selling, transcoding and/or downloading digital media) and/or digital media suggestion and/or recommendation services (e.g., suggesting media content based on an image capture).

The media server 120 may be operable to communicate data and/or messages via wired and/or wireless connections configured in accordance with one or more supported wireless and or wired protocols, standards and/or interfaces (e.g. Ethernet, Bluetooth, WiFi, cellular, WiMAX, WLAN, NFC) with electronic devices, such as, for example, the electronic device 110. The media server 120 may be enabled to process, store, manage and/or communicate data and/or messages relevant to providing digital media services to electronic devices, such as, for example, the electronic device 110. Furthermore, the media server 120 may be operable to provide communication services to and from the electronic device 110 and/or the personal digital media library 140. For example, the media server 120 may include one or more transceivers for providing wired and/or wireless communication of data to and from the electronic device 110 and/or the personal digital media library 140.

In an example embodiment of the disclosure, the media server 120 may receive, store, manage and/or process information and/or data relating to user interactions (e.g., playing, purchasing, marking up or down as to indicate preferences and/or interests) with digital media items.

In an example embodiment of the disclosure, the media server 120 may provide and/or manage user registration and/or authentication services. In this regard, a user of an electronic device, such as, for example, the electronic device 110, may register with the registration/authentication services provided by the media server 120, by for example creating a user account. The user may register one or more electronic devices under the user account. The media server 120 may provide user authentication services. For example, the media server 120 may provide a prompt to the user to enter authentication information on the electronic device 110 through a graphical user interface (GUI). The electronic device 110 may send the authentication information to the media server 120 for authenticating the user.

In an example embodiment of the disclosure, the media server 120 may automatically authenticate the user or an electronic device associated with the user, such as, for example, the electronic device 110, when the electronic device 110 itself (e.g., without the user's intervention) or the user through the electronic device 110 sends a request, to a media server, such as, for example, the media server 120, for suggestions and/or recommendations based on an image capture for products and/or services, such as, for example, products and/or services relating to digital media content. In this regard, when the media server 120 receives the request, the media server 120 may verify the identity of the electronic device 110. The media server 120 may initiate and/or perform a search on a user registration database to determine whether the electronic device 110 corresponds to a particular user and authenticate the particular user based on the correspondence.

The media server 120 may comprise a dedicated system and/or a general-purpose system configured to provide digital media services (e.g., suggesting media content based on an image capture) to electronic devices, such as, for example, the electronic device 110. The disclosure, and/or any implementation(s) in accordance therewith, however, are not limited to any particular type of a media server. The media server 120 may, for example, comprise the media server 300 as depicted and/or described with respect to FIG. 3.

The personal digital media library (PDML) 140 may comprise suitable logic, circuitry, code, and/or interfaces that may be operable to store and/or manage a plurality of digital media items (PDMIs) 142. In this regard, the personal digital media library 140 may be operable to store and/or manage the plurality of PDMIs 142, digital playlists comprising one or more of the plurality of the PDMIs 142 and/or a play order. The PDML 140 may store and/or manage play, purchase and/or interaction history with the PDMIs 142. Even though the personal digital media library 140 is illustrated as being separate from the electronic device 110, the disclosure may not be limited in this regard. More specifically, the personal digital media library 140 may be implemented as part of the electronic device 110. Even though the personal digital media library 140 is illustrated as being separate from the media server 120, the disclosure may not be limited in this regard. More specifically, the personal digital media library 140 may be, for example, hosted in a cloud based storage provided, managed and/or supported by the media server 120 and/or may be accessible to a user associated with the personal digital medial library 140 from any electronic device, such as, for example, the electronic device 110.

In operation, an electronic device, such as, for example, the electronic device 110, may send a request, to a media server, such as, for example, the media server 120, for suggestion(s) and/or recommendation(s) based on an image capture. The request may be, for example, sent in response to user interactions with the electronic device 110 (e.g., accessing a particular application operable to send and/or initiate sending the request).

In an example embodiment of the disclosure, a user may be browsing a personal digital media library, such as, for example, the PDML 140 (e.g., through a web-based application, a media player application) and may request suggestion(s) and/or recommendation(s) based on an image capture. The electronic device 110, in response to the request, may initiate a camera interface. The user may, through, for example a graphical user interface (GUI), capture an image (e.g., take a still image and/or video of a camera capture object, such as, for example, the camera capture object 130). In an example embodiment of the disclosure, the user may select an image (e.g., an image captured at a different time) from, for example, the memory of the electronic device 110 and/or from another location outside the electronic device 110 (e.g., cloud storage, another electronic device).

The electronic device 110 may process the image and/or the image capture and may send to the media server 120 a request for suggestion(s) and/or recommendation(s) based on the image and/or the image capture. The request may include the image, the image capture and/or data associated with the image and/or the image capture.

The media server 120 may receive the request for suggestion(s) and/or recommendation(s) based on the image and/or the image capture. In this regard, the media server 120 may process the request and/or may determine custom suggestion(s) and/or recommendation(s).

In an example embodiment of the disclosure, the media server 120 may perform a variety of image processing techniques (e.g., image composition deviation, optical character recognition (OCR), facial recognition, visual search, metadata extraction, etc.) on the image and/or the image capture to determine one or more search object. The search objects may be related to, for example, products and/or services provided by the media server 120. For example, the search objects may comprise information and/or data related to an artist, album, digital media item, concerts, concert tickets and/or other products and/or services related to digital media content.

The media server 120 may determine a personal digital media library associated with a particular user. In this regard, the media server 120 may determine a particular user associated with the electronic device by, for example, initiating a search in a user registration database. Based on the search, the media server 120 may determine a personal digital media library associated with the particular user, such as, for example the PDML 140.

In an example embodiment of the disclosure, the media server 120 may receive from the electronic device 110 user data, such as, for example user demographic information (e.g., age, gender) and/or user interest(s) (e.g., related to digital media content and/or otherwise relevant to the products and/or services provided by the media server 120). In another example embodiment of the disclosure, the media server 120 may determine the user demographic information and/or user interest(s) by, for example, initiating a search on a user registration database.

The media server 120 may determine search interest based on the PDML 140, user data and/or user interests. The media server 120 may compare one or more of the search objects with one or more of the search interests to determine custom suggestion(s) and/or recommendation(s) for the particular user.

In an example embodiment of the disclosure, the media server 120 may provide the suggestion(s) and/or recommendation(s) for a particular user independent of a language associated with the particular user. For example, the particular user may visit a foreign country and, while visiting the foreign country, the particular user may request suggestion(s) and/or recommendation(s) based on an image capture that may contain foreign characters (e.g., characters/words/sentences in a language other than a language native to the particular user). Specifically, the user may submit the request suggestion(s) and/or recommendation(s) because, for example, the user may have been intrigued by a picture of, for example, an artist and/or album, but the user may not have been able to read and/or understand the description associated with the artist and/or alum (e.g. name). The media server 120 may be operable to process the image containing the foreign characters (e.g., as part of the processing of the request) and may be operable to provide suggestion(s) and/or recommendation(s) to the user in user's native language. The suggestions(s) and/or recommendation(s) may, for example, include products and/or services related to the artist and/or album that may have been depicted in the image capture (e.g., DMIs by the artist and/or by another artist thematically related (e.g., an artist categorized in the same and/or similar genre as the artist depicted in the image capture) to the artist depicted in the image capture, concert tickets to an upcoming concert by the artist and/or by another artist thematically related to the artist, etc.).

Even though the operation of the electronic device 110 and/or the media server 120 is illustrated with respect to suggesting media content based on an image capture, the disclosure may not be limited in this regard. More specifically, media content may be suggested and/or recommended, by for example, a media server, such as, for example, the media server 120, based on information other than an image capture received from an electronic device, such as, the electronic device 110. For example, the suggestion(s) and/or recommendation(s) may be based on, for example, an image capture, a news article, multimedia content (e.g., music videos, movies movie trailers, etc.), maps and/or other content and/or interactions. In this regard, the content and or interactions need not be received from an electronic device.

Even though the operation of the electronic device 110 and/or the media server 120 is illustrated with respect to suggesting media content, the disclosure may not be limited in this regard. More specifically, suggestion(s) and/or recommendation(s) may relate to content other than the media content, such as, for example, images, news articles, news, maps, etc. In this regard, the content and or interactions need not be received from an electronic device.

Figure 2:
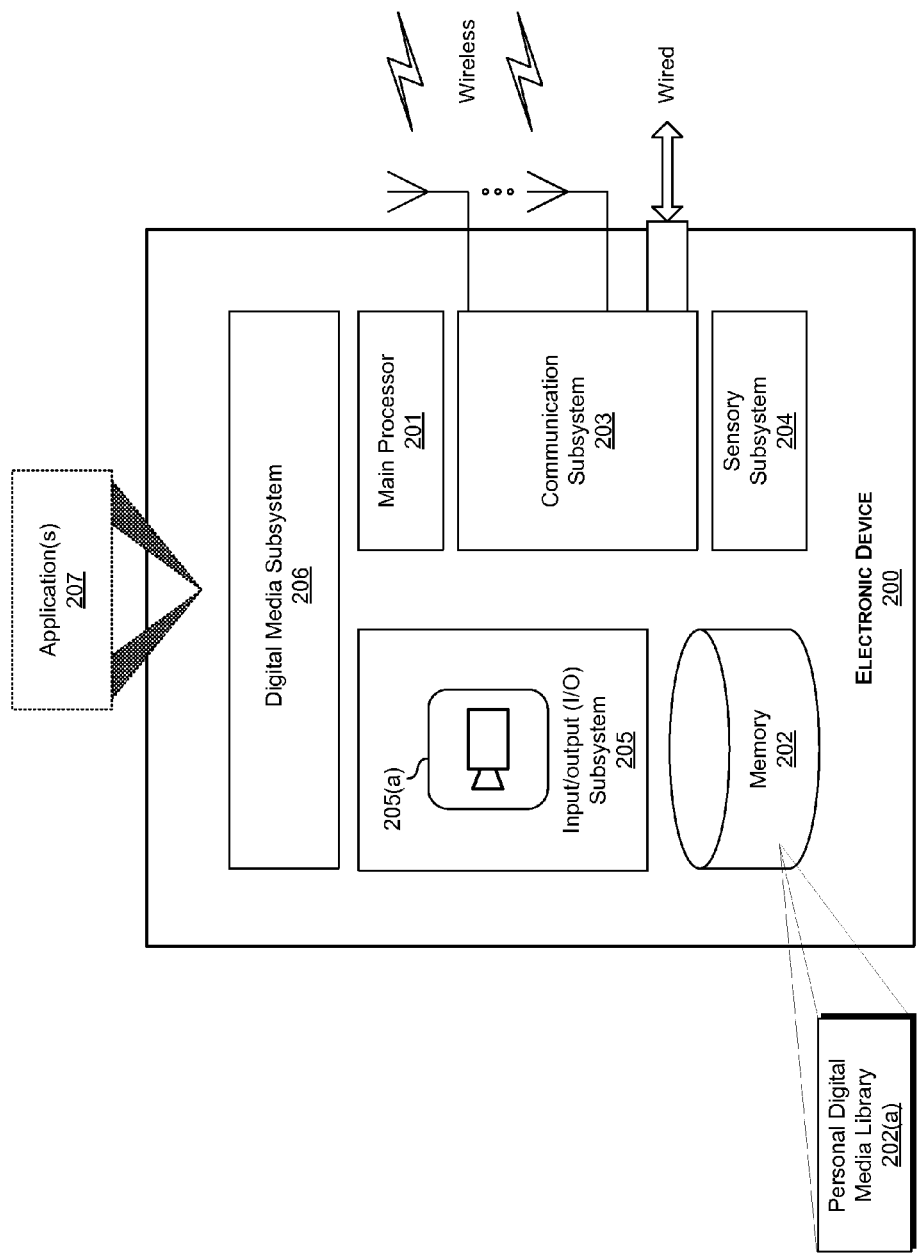
FIG. 2 is a block diagram of example electronic device that supports suggesting media content based on an image capture, in accordance with an example embodiment of the disclosure.

FIG. 2 is a block diagram of example electronic device that supports suggesting media content based on an image capture, in accordance with an example embodiment of the disclosure. Referring to FIG. 2, there is shown an electronic device 200.

The electronic device 200 may comprise suitable logic, circuitry, interfaces, and/or code that may be operable to implement various aspects of the disclosure. In this regard, the electronic device 200 may correspond to the electronic device 110, as depicted in and/or described with respect to FIG. 1. The electronic device 200 may comprise, for example, a main processor 201, a memory 202, a communication subsystem 203, a sensory subsystem 204, an input/output (I/O) subsystem 205, and/or a digital media subsystem 206.

The main processor 201 may comprise suitable logic, circuitry, interfaces, and/or code that may be operable to process data, and/or control and/or manage operations of the electronic device 200, and/or tasks and/or applications performed therein. In this regard, the main processor 201 may be operable to configure, manage and/or control operations of various components and/or subsystems of the electronic device 200, such as, for example, the memory 202, the communication subsystem 203, the sensory subsystem 204, the I/O subsystem 205, and/or the digital media subsystem 206, by utilizing, for example, one or more control signals. The main processor 201 may enable running and/or executing applications, programs and/or code, which may be stored, for example, in the memory 202. Alternatively, one or more dedicated application processors may be utilized for running and/or executing applications, programs and/or code in the electronic device 200. In some instances, the applications running and/or executing on the electronic device 200 may comprise a plurality of applications 207, which may support suggesting media content based on an image capture.

The memory 202 may comprise suitable logic, circuitry, interfaces, and/or code that that may be operable to enable permanent and/or non-permanent storage, buffering, and/or fetching of data, code and/or other information, which may be used, consumed, and/or processed by the components of the electronic device 200. In this regard, the memory 202 may be enabled to store executable instructions to manage and/or configure, for example, the main processor 201, the communication subsystem 203, the sensory subsystem 204, the input/output (I/O) subsystem 205, and/or the digital media subsystem 206. The memory 202 may store, for example, configuration data, which may comprise parameters and/or code, comprising software and/or firmware. The memory 202 may comprise different memory technologies, including, for example, read-only memory (ROM), random access memory (RAM), low latency nonvolatile memory, flash memory, solid-state drive (SSD), field-programmable gate array (FPGA), and/or other suitable electronic data storage capable of storing data, code and/or other information.

The memory 202 may comprise a personal digital media library (PDML) 202(*a*). The PDML 202(*a*) may correspond to the PDML 140 as depicted in and/or described with respect to FIG. 1. In this regard, the PDML 202(*a*) may comprise suitable logic, circuitry, code, and/or interfaces that may be operable to store and/or manage a plurality of personal digital media items (PDMIs). Even though the PDML 202(*a*) is illustrated as being a part of the electronic device 200, the disclosure may not be limited in this regard. More specifically, the PDML 202(*a*) may be, for example, hosted in a cloud based storage provided, managed and/or supported by a media server, such as, for example the media server 300 as depicted in and/or described with respect to FIG. 3, and/or may be accessible to a user associated with the PDML 202(*a*) from any electronic device, such as, for example, the electronic device 200.

The communication subsystem 203 may comprise suitable logic, circuitry, interfaces, and/or code that may be operable to communicate data from and/or to the electronic device 200, such as via one or more wired and/or wireless connections. For example, the communication subsystem 203 may comprise one or more transceivers for providing wired and/or wireless communication of data. The communication subsystem 203 may be configured to support one or more wired and/or wireless protocols, standards and/or interfaces (e.g., Ethernet, Bluetooth, WiFi, satellite and/or cellular network, WiMAX, WLAN, NFC) facilitating transmission and/or reception of signals to and/or from the electronic device 200, and/or processing of transmitted or received signals in accordance with applicable wired or wireless protocols. In this regard, signal-processing operations may comprise filtering, amplification, analog-to-digital conversion and/or digital-to-analog conversion, up-conversion/down-conversion of baseband signals, encoding/decoding, encryption/decryption, and/or modulation/demodulation.

The sensory subsystem 204 may comprise suitable logic, circuitry, interfaces, and/or code that may be operable to obtain and/or generate sensory information, which may relate to the electronic device 200, its user(s), and/or its environment. For example, the sensory subsystem 204 may comprise positional or locational sensors (e.g., GPS, GNSS, WiFi, BT, BTL, BTLE sensors), ambient condition sensors (e.g., temperature, humidity, or light), and/or motion related sensors (e.g., accelerometer, gyroscope, pedometers, and/or altimeters).

The I/O subsystem 205 may comprise suitable logic, circuitry, interfaces, and/or code that may be operable to enable user interactions with the electronic device 200, obtain input from user(s) of the electronic device 200 and/or provide output to the user(s). The I/O subsystem 205 may support various types of inputs and/or outputs, including, for example, video, audio, and/or textual. In this regard, dedicated I/O devices and/or components, external to or integrated within the electronic device 200, may be utilized for inputting and/or outputting data during operations of the I/O subsystem 205. Example (external or integrated) I/O devices may comprise displays, mice, keyboards, touchscreens, voice input interfaces, still image and/or video capturing devices, such as, for example, the one or more camera(s) 205(a) and/or other input/output interfaces and/or devices.

The digital media subsystem 206 may comprise suitable logic, circuitry, interfaces, and/or code that may be operable to initiate, receive, process and/or manage a request for suggestion(s) and/or recommendation(s) based on an image capture and/or suggestion(s) and/or recommendation(s) received by the electronic device 200 in response to a request for such suggestion(s) and/or recommendation(s). In this regard, the digital media subsystem 206 may be operable to monitor user interactions with the electronic device 200 to determine whether and/or when to initiate sending a request to a media server for suggestion(s) and/or recommendation(s) based on an image capture.

In an example embodiment of the disclosure, the digital media subsystem 206 may monitor various applications (e.g., Application(s) 207) and/or processes running on the electronic device 200 to determine whether, for example, the user of the electronic device 200 requested suggestion(s) and/or recommendation(s) based on an image capture. More specifically, the digital media subsystem 206 may determine that, for example, the user accessed a particular application that may be operable to provide various interactions with digital media content (e.g., a media player application, a personal digital media library, a web browser application, etc.). The digital media subsystem 206 may further monitor whether the user requested suggestion(s) and/or recommendation(s) and/or whether a suggestion and/or recommendation triggering event has occurred. For example, the user, while browsing a personal digital media library, may, through a user interface, request suggestion(s) and/or recommendation(s) based on an image capture (e.g., the user may select an option "Search/Recommend Content Based on Camera Images"). In response to the example user interaction, the digital media subsystem 206 may, for example, initiate a camera application and/or interface and/or request access to the one/or more cameras 205(a).

In an example embodiment of the disclosure, the digital media subsystem 206 may monitor the operation of the camera application and/or interface and/or the one/or more cameras 205(a) to determine whether and/or when a request for suggestion(s) and/or recommendation(s) based on an image capture may need to be sent to a media server (e.g., when the user captured and/or selected an image capture as the basis of the request). The digital media subsystem 206 may initiate sending the request to the media server. Furthermore, the digital media subsystem 206 may monitor the operation of a communication subsystem 203 to, for example, determine whether a response (e.g., recommendation data) to a request for suggestion(s) and/or recommendation(s) based on an image capture may have been received from the media server. The digital media subsystem 206 may present and/or cause to be presented to the user the recommendation data (processed or unprocessed) received from the media server. In this regard, the digital media subsystem 206 may determine how (e.g., through what application) the user submitted the request for suggestion(s) and/or recommendation(s) in order to present and/or cause to be presented to the user the recommendation data (processed or unprocessed) utilizing a similar method. For example, if the user requested the suggestion(s) and/or recommendation(s) through a media player application, the digital media subsystem 206 may present and/or cause to be presented the recommendation data (processed or unprocessed) to the user through the media player application.

In operation, the electronic device 200 may send a request for suggestion(s) and/or recommendation(s) based on an image capture. In this regard, the digital media subsystem 206 may monitor the electronic device (and/or its components, applications, processes and/or functions, etc.) to determine whether an event triggering a request for suggestion(s) and/or recommendation(s) based on an image capture has occurred. The digital media subsystem 206 may request from the I/O subsystem 205 and/or from an application (e.g., Application(s) 207) to provide to the digital media subsystem 206 an image capture (and/or instructions for accessing the image capture) on which the request for suggestion(s) and/or recommendation(s) is to be based. The I/O subsystem 205 may receive and/or process an image capture from the one or more camera(s) 205(a) and may provide the image capture to the digital media subsystem 206.

In an example embodiment of the disclosure, the image capture may be retrieved from memory, such as the memory 202, by the digital media subsystem 206, in response to, for example, user selection of an already captured and/or stored image as the basis for the request for suggestion(s) and/or recommendation(s).

The digital media subsystem 206 may receive and/or process the image capture. The digital media subsystem may prepare a request for suggestion(s) and/or recommendation(s) based on the image capture. The request may comprise image data (e.g., still and/or video image(s) and/or metadata information relating to the still and/or video image(s), such as, for example, date, time, location, duration).

The digital media subsystem 206 may request from the communication subsystem 203 for the communication subsystem 203 to send the request to a media server. The communication subsystem 203 may send the request to the media server.

In an example embodiment of the disclosure, the electronic device 200 may receive, from a media server, recommendation data. In this regard, the communication subsystem 203 may receive and/or process the recommendation data and may send the recommendation data (processed or unprocessed) to the digital media subsystem 206. The digital media subsystem 206 may determine whether the recommendation data may be presented to the user of the electronic device 200. The digital media subsystem 206 may further determine a method of presenting and/or causing to be presented the recommendation data (processed or unprocessed) and/or may present and/or cause to be presented the recommendation data to the user of the electronic device 200.

Figure 3:
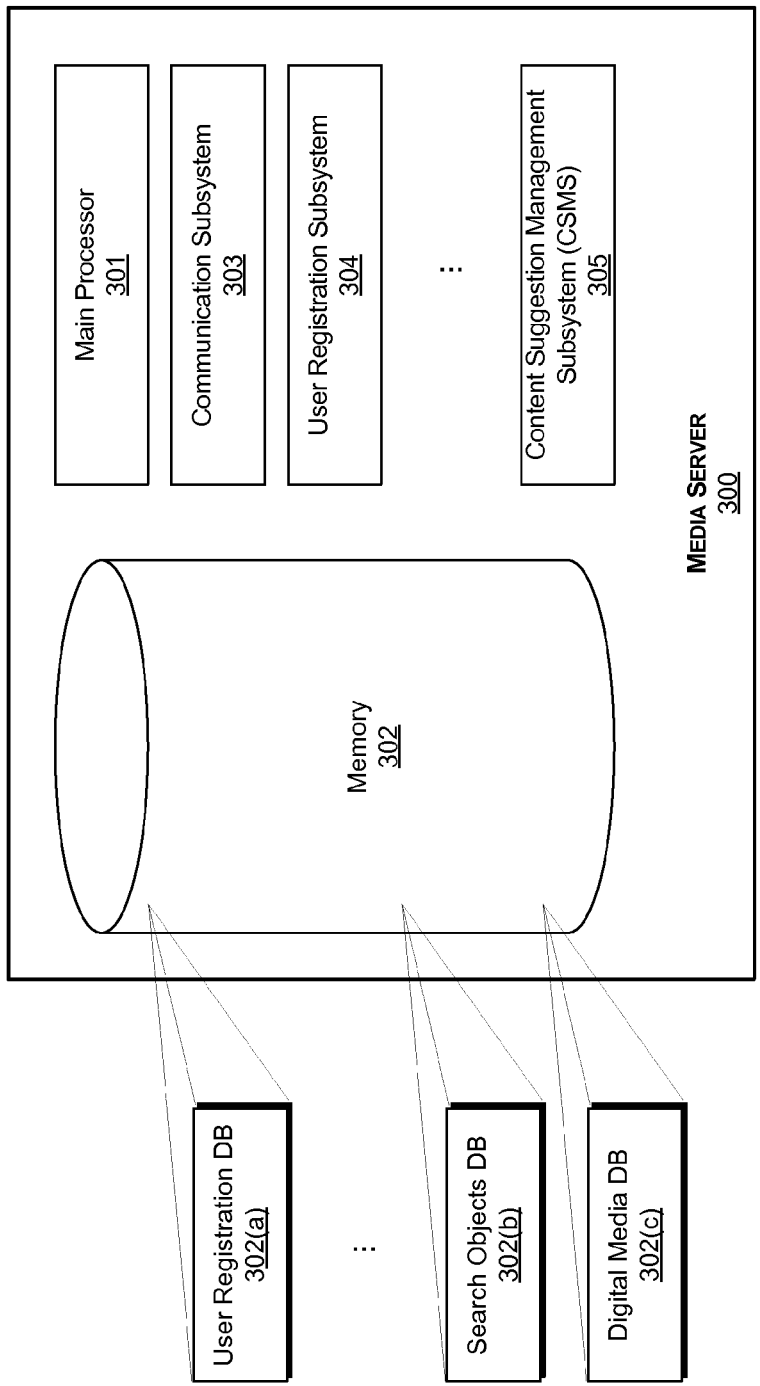
FIG. 3 is a block diagram of example media server that supports suggesting media content based on an image capture, in accordance with an example embodiment of the disclosure.

FIG. 3 is a block diagram of example media server that supports suggesting media content based on an image capture, in accordance with an example embodiment of the disclosure. Referring to FIG. 3, there is shown a media server 300.

The media server 300 may comprise suitable logic, circuitry, code, and/or interfaces that may be operable to implement various aspects of the disclosure. In this regard, the media server 300 may correspond to the media server 120 of FIG. 1. The media server 300 may, for example, comprise a main processor 301, a memory 302, a communication subsystem 303, a user registration subsystem 304, and/or a content suggestion management subsystem (CSMS) 305.

The main processor 301 may comprise suitable circuitry, interfaces, logic, and/or code that may be operable to process data, and/or control and/or manage components, operations and/or functions of the media server 300, and/or tasks performed therein. In this regard, the main processor 301 may configure and/or control operations of various components and/or subsystems of the media server 300, such as, for example, the memory 302, the communication subsystem 303, the user registration subsystem 304, and/or the CSMS 305, by utilizing, one or more control signals.

The memory 302 may be substantially similar to, for example, the memory 202 of FIG. 2. In this regard, the memory 302 may comprise suitable logic, circuitry, interfaces, and/or code that that may be operable to enable permanent and/or non-permanent storage, buffering, and/or fetching of data, code and/or other information, which may be used, consumed, and/or processed by the components of the media server 300. In this regard, the memory 302 may be enabled to store executable instructions to manage and/or configure, for example, the main processor 301, the communication subsystem 303, the user registration subsystem 304, and/or the CSMS 305.

The memory 302 may comprise one or more databases such, as for example, a user registration database 302(a), search objects database 302(b) and/or a digital media database 302(c).

The user registration database 302(a) may comprise a plurality of entities each corresponding to a particular user of digital media services, such as, for example the digital media services provided by the media server 300. In this regard, each entity may comprise information and/or data, such as, for example, user name, account password, information and/or data about electronic devices associated with the user (e.g., type, brand, model, name, phone number, serial number) and/or information and/or data related to a history of user interactions with product(s) and/or service(s) provided by the media server 300, such as, for example, a history of user responses to suggestion(s) and/or recommendation(s) from the media server 300 (e.g., whether the user purchased and/or interacted with the content of the suggestion(s) and/or recommendation(s), whether the user marked up or down a particular DMI suggested and/or recommended by the media server 300 etc.) and/or other information voluntarily submitted by the user (e.g., age, gender, digital content preferences).

The search objects database 302(b) may comprise a plurality of entities each corresponding to a search object related to products and/or services provided by the media server 300. For example, the search object may comprise text, image and/or other data. The search objects may be related to digital media items (DMIs), such as the DMIs that may be associated with the digital media database 302(c), events (e.g., concerts) and/or products (e.g., concert tickets).

The digital media database (DMDB) 302(c) may comprise suitable logic, circuitry, code, and/or interfaces that may be operable to store and/or manage a plurality of digital media items (DMIs). In this regard, the DMDB 302(c) may comprise a plurality of entities each corresponding to a digital media item (DMI).

The communication subsystem 303 may be substantially similar to, for example, the communication subsystem 203 as depicted in and/or described with respect to FIG. 2. In this regard, the communication subsystem 303 may comprise suitable logic, circuitry, interfaces, and/or code that may be operable to communicate data from and/or to the media server 300, such as via one or more wired and/or wireless connections.

The user registration subsystem 304 may comprise suitable logic, circuitry, interfaces, and/or code that may be operable to communicate, process and/or manage user registration and/or authentication requests and/or device registration and/or authentication requests. In this regard, the user registration subsystem 304 may be operable to manage user accounts (e.g., create and/or store new user accounts, access, store, update, modify and/or mange existing user accounts), mange user devices (e.g., add, delete, modify, authorize, de-authorize and/or manage devices associated with a particular user account). The user registration subsystem 304 may access, manage and/or process data in the user registration database, such as, for example, the user registration database 302(a). For example, upon receiving a request to create a new user account, the user registration subsystem 304 may create a data entity in the user registration database 302(a).

The content suggestion management subsystem (CSMS) 305 may comprise suitable logic, circuitry, interfaces, and/or code that may be operable to receive, process and/or manage a request for suggestion(s) and/or recommendation(s) based on an image capture. The CSMS 305 may be operable to present and/or cause to be presented suggestion(s) and/or recommendation(s) based on an image capture to a user of an electronic device. The CSMS 305 may comprise, for example, an image processing module, a search objects module and/or a recommendation module as depicted in and/or described with respect to FIG. 4. The CSMS 305 may be operable to process an image capture, determine search objects based on the image capture (processed and/or unprocessed) and/or provide suggestion(s) and/or recommendation(s) based on, for example, the search objects.

In operation, the media server 300 may be operable to receive from an electronic device such as, for example, the electronic device 200, a request for suggestion(s) and/or recommendation(s) based on an image capture. The request may comprise image data (e.g., image capture). In this regard, the communication subsystem 303 may receive and/or process the request and may send the request (processed or unprocessed) to the CSMS 305. The CSMS 305 may analyze the image data. In this regard, the CSMS 305 may perform a variety of image processing techniques (e.g., image composition deviation, optical character recognition (OCR), facial recognition, visual search, metadata extraction, etc.) in order to determine search objects. In this regard, the CSMS 305 may utilize data and/or information obtained during the analysis to, for example, initiate a search on a search objects database, such as, for example, the search objects database 302(*b*). The search may include a text and/or image based search and/or any other method of comparison of data and/or information obtained through an image analysis to entities of a database.

In an example embodiment of the disclosure, the CSMS 305 may initiate a search on a user registration database, such as, for example, the user registration database 302(*a*) to determine a particular user associated with the electronic device 200. The CSMS 305 may determine a personal digital media library associated with the particular user. The CSMS 305 may determine (e.g., from the user registration database 302(*a*)) and/or receive (e.g., from the electronic device 200) user data and/or information. Based on the personal digital media library and/or the user data, the CSMS 305 may determine search interests.

The CSMS 305 may determine suggestion(s) and/or recommendation(s) for the particular user based on the search objects and/or the search interests. The CSMS 305 may request from the communication subsystem 303 for the communication subsystem 303 to send to the electronic device 110 recommendation data, which may comprise suggestion(s) and/or recommendation(s) in response to the request for suggestion(s) and/or recommendation(s) based on an image capture.

The components of the media server 300, such as for example, the main processor 301, the memory 302, the communication subsystem 303, the user registration subsystem 304, and/or the CSMS 305 may be implemented in an integrated or a distributed system. An integrated system may be implemented, for example, on one computer, server, machine or device, where the integrated system may be configured to perform some or all of the functions, features and/or operations of the main processor 301, the memory 302, the communication subsystem 303, the user registration subsystem 304, and/or the CSMS 305 as described herein. A distributed system may be implemented with multiple components (e.g., computers, servers, machines and/or devices), where each of the multiple components may be configured to perform some or all of the functions, features and/or operations of the main processor 301, the memory 302, the communication subsystem 303, the user registration subsystem 304, and/or the CSMS 305 as described herein. Each function, feature and/or operation may be implemented on one or more of the components of the distributed system. For example, a specific feature, function and/or operation may be implemented on one component of the distributed system or it may be implemented across multiple components of the distributed system.

Figure 4:
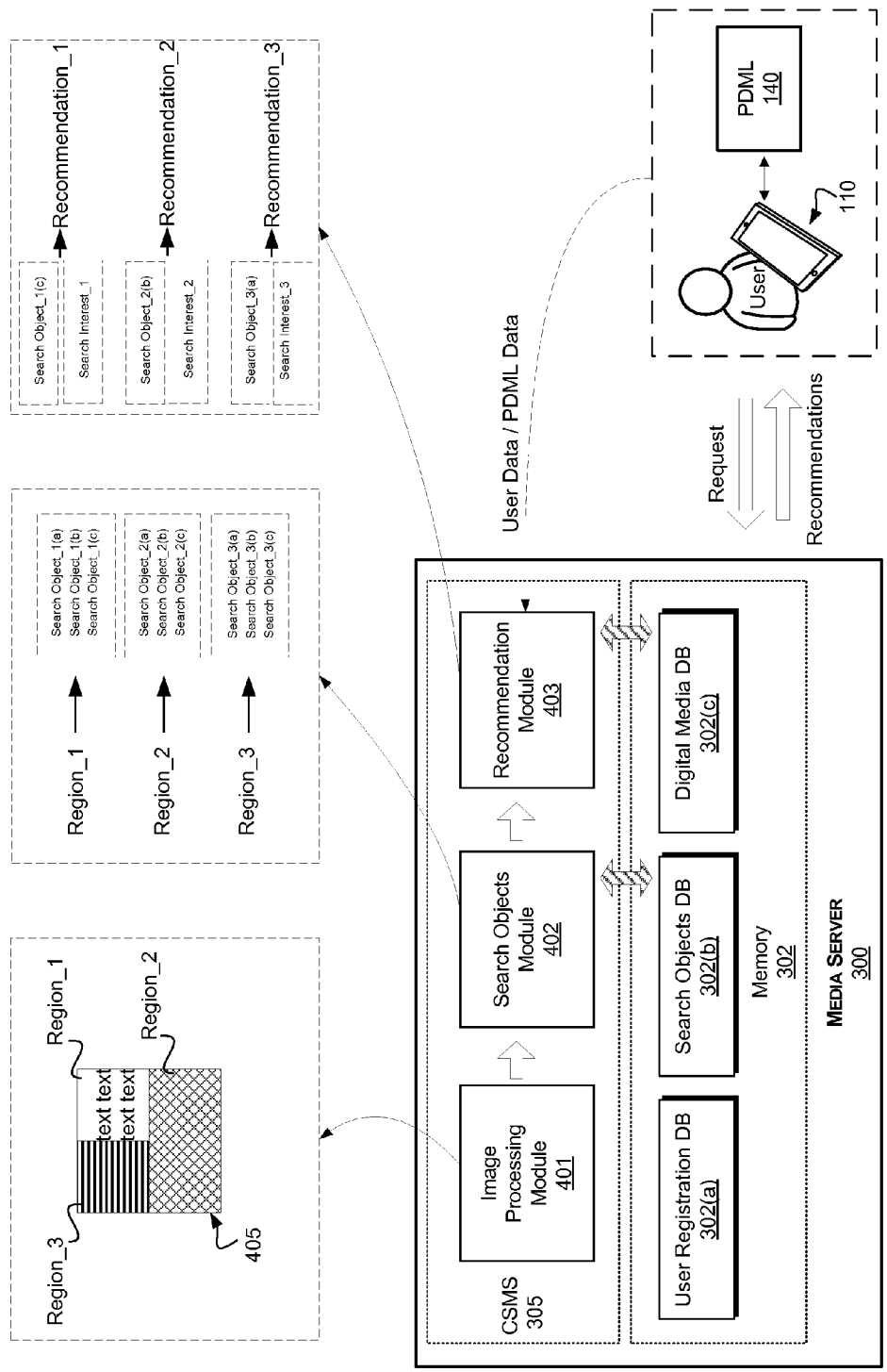
FIG. 4 is a block diagram of example process of suggesting media content based on an image capture by a media server, in accordance with an example embodiment of the disclosure.

FIG. 4 is a block diagram of example process of suggesting media content based on an image capture by a media server, in accordance with an example embodiment of the disclosure.

Referring to FIG. 4, there is shown an electronic device 110, a personal digital media library (PDML) 140, an image capture 405 and a media server 300.

The CSMS 305 may comprise an image processing module 401, search objects module 402 and/or recommendation module 403. The image processing module 401 may comprise suitable logic, circuitry, code, and/or interfaces that may be operable to analyze and/or process a still and/or a video image and/or data and/or information related to the still and/or video image. In this regard, the image processing module 401 may determine image regions by, for example, utilizing one or more of a variety of image processing techniques (e.g., image composition deviation, optical character recognition (OCR), facial recognition, visual search, metadata extraction, etc.).

The search objects module 402 may comprise suitable logic, circuitry, code, and/or interfaces that may be operable to determine search object. In this regard, the search objects module 402 may be operable to determine search objects based on data and/or information obtained through an image (and/or image data) analysis as performed by the image processing module 401. For example, the search objects module 402 may determine that an image of a particular artist (or a region of an image that portrays a particular artist) corresponds to, for example products and/or services related to the particular artist (e.g., DMIs and/or concerts by the particular artist).

The recommendation module 303 may comprise suitable logic, circuitry, code, and/or interfaces that may be operable to determine suggestions and/or recommendations based on an image capture. The recommendation module 303 may determine search interest based on, for example, user data (e.g., user's interests, contents of a personal media library associated with the user, etc.). Base on, for example, the search objects as determined by the search objects module 402 and/or the search interests, the recommendation module 403 may be operable to determine suggestions and/or recommendations for the user.

In operation, the media server 300 may receive a request from the electronic device 110 for suggestion(s) and/or recommendation(s) based on an image capture, such as, for example, the image capture 405. In response to the request, the image processing module 401 may analyze and/or process the image capture and/or other data received with the request. The image processing module 401 may determine one or more regions of the image capture 405 through one or more of a variety of image processing techniques (e.g., image composition deviation, optical character recognition (OCR), facial recognition, visual search, metadata extraction, etc.). For example, the image processing module 401 may determine that the image capture comprises, for example, three (3) regions: Region_1, Region_2 and Region_3. The regions may be, for example, text regions, graphical regions and/or a combination of both. Referring to FIG. 4, Region_1 may be a text region, and Region_2 and Region_3 may each be a graphical region. Although the regions may have been illustrated as separate regions, the disclosure may not be limited in this way. For example, the regions may be overlapping.

The image processing module 401 may communicate with the search objects module 402 and may request from the search objects module 402 for the search objects module 402 to determine one or more search objects for one or more of the regions. In this regard, the search objects module 402 may initiate a search of search objects on the search objects database 302(*b*). Based on the search, the search objects module 402 may determine zero or more search objects corresponding to one or more of the regions. Referring to FIG. 4, the search objects module 402 may determine, for example, that Search Object_1(a), Search Object_1(b) and/or Search Object_1(c) each corresponds to Region_1, that Search Object_2(a), Search Object_2(b) and/or Search Object_2(c) each corresponds to Region_2, and/or that Search Object_3(a), Search Object_3(b) and/or Search Object_3(c) each corresponds to Region_3. Although the search objects corresponding to different regions may have been illustrated as separate search objects, the disclosure may not be limited in this way. For example, more than one search object may correspond to more than one region and vice versa.

In an example embodiment of the disclosure, the search objects module 402 may determine one or more search objects based on information about the image capture 405 (e.g., date, time, location, duration, etc.) in addition to and/or in conjunction with the data and/or information relating to the regions of the image capture 405 as determined by the image processing module 401.

The search objects module 402 may communicate with the recommendation module 403 and may request from the recommendation module 403 for the recommendation module 403 to determine one or more suggestions and/or recommendations based on the one or more search objects.

In an example embodiment of the disclosure, the recommendation module 403 may determine a particular user associated with the electronic device 110 by initiating a search on the user registration database 302(a). The recommendation module 403 may determine a personal digital media library associated with the particular user, such as, for example the PDML 140, and may analyze the contents of the PDML 140 (e.g., personal digital media items). In another example embodiment of the disclosure, the recommendation module 403 may request and/or receive from the electronic device 110 user data (e.g., demographic data, user interests, likes, etc.). The recommendation module 403 may also determine user data by initiating and/or analyzing a search on the user registration database 302(a).

The recommendation module 403 may determine one or more search interests based on the analysis of the contents of the PDML 140 and/or the user data. Referring to FIG. 4, the recommendation module 403 may determine, for example, Search Interest_1, Search Interest_2 and/or Search Interest_3.

The recommendation module 403 may compare one or more of the search objects as determined by the search objects module 402 with one or more search interest. The recommendation module 403 may, for example, based on the comparison, determine which search objects are relatively more applicable to the particular user. For example, Search Object_1(a), Search Object_1(b) and Search Object_1(c) may correspond to Artist_A, Artist_B and Artist_C, respectively. Also, for example, Search Interest_1 may correspond to Artist_C. More specifically, the Search Object_1(c) may have been determined by the search objects module 402 based on a mention of Artist_C in the text of Region_1 and Search Interest_1 may have been determined by the recommendation module 403 based on the analysis of the PDML 140 which revealed that, for example, the PDML 140 comprised relatively many DMIs by Artist_A.

Based on the comparison of the Search Object_1(c) and the Search Interest_1, the recommendation module 403 may determine that the particular user may be interested in recommendations relating to Artist_C, such as, for example, DMIs by Artist_C which are, for example, not included within the PDML 140, DMIs by an artist related to Artist_C (e.g., categorized under the same and/or similar genre as Artist_C), upcoming concerts by Artist_C and/or an artist related to Artist_C, etc.

In an example embodiment of the disclosure, the recommendation module 403 may initiate a search on the digital media database 402(c) to determine, for example, the DMIs by Artist_C and/or an artist related to Artist_C.

By performing a similar analysis of one or more search objects as determined by the search objects module 402 and/or one or more search interest as determined by the recommendation module 403, the recommendation module 403 may determine one or more recommendations for the particular user. Referring to FIG. 4, the recommendation module 403 may, for example, determine Recommendation_1 based on Search Object_1(c) and Search Interest_1, Recommendation_2 based on Search Object_2(b) and Search Interest_2 and/or Recommendation_3 based on Search Object_3(a) and Search Interest_3.

The media server 300 may send, to the electronic device 110, recommendation data, in response to the request for suggestion(s) and/or recommendations(s) based on the image capture 405. The recommendation data may comprise the recommendation(s) as determined by the recommendation module 403.

Although the comparison of the search objects and/or search interests may have been exemplified as a one-to-one comparisons (e.g., one search object compared with one search interest), the disclosure may not be limited in this way. For example, the comparison may include comparing one or more search objects with one or more search interests in any combination of search objects and/or search interests. Moreover, the disclosure may not be limited to any particular comparison of search objects and search interests method and/or a recommendation method and may include any other method that arrives at recommendation(s) based on an image capture, personal digital media library data and/or user data.

Figure 5:
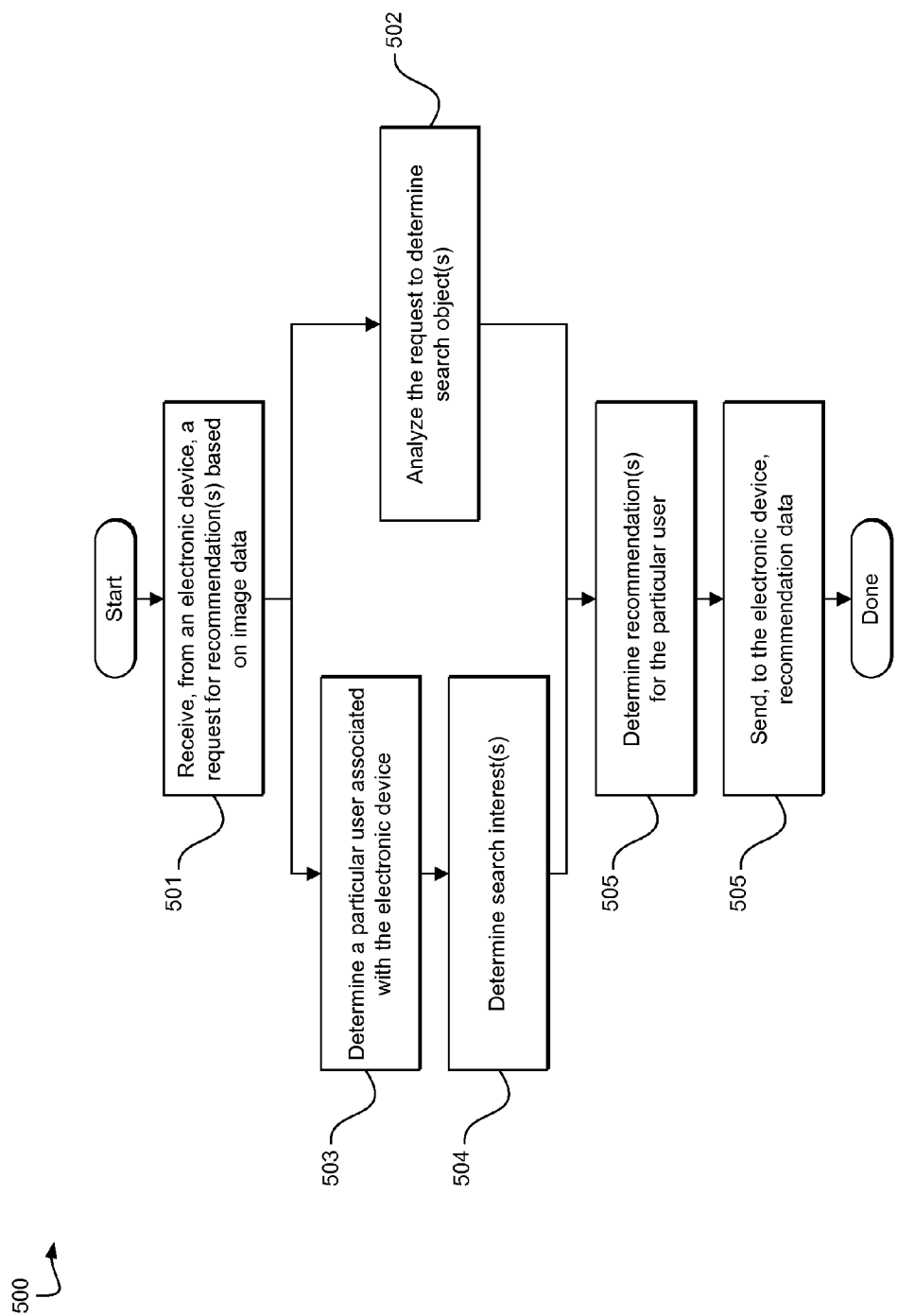
FIG. 5 is a flow diagram of example steps of a method for suggesting media content based on an image capture, in accordance with an example embodiment of the disclosure.

FIG. 5 is a flow diagram of example steps of a method for suggesting media content based on an image capture, in accordance with an example embodiment of the disclosure. Referring to FIG. 5, an example method 500 is shown comprising a plurality of example steps for suggesting media content based on an image capture.

In example step 501, a request for suggestion(s) and/or recommendation(s) based on, for example, a still and/or a video image, may be received from an electronic device, such as, for example, the electronic device 200. In this regard, a media server, such as, for example, the media server 300 may receive and/or process the request. The request may comprise image data. The image data, may comprise still and/or video image(s) and/or metadata information relating to the still and/or video image(s) (e.g., date, time, location, duration, etc.). The request may, for example, be generated by an application running on an electronic device (e.g., media player application, web-browser application) in response to, for example, a pre-defined criterion, such as for example, a user direct action (e.g., user input indicative of a request for suggestion(s) and/or recommendation(s)), a user indirect action (e.g., accessing an image capture application, a media player application, or a media store web browser application, etc.), and/or any other pre-defined criterion (e.g., laps of a pre-determined amount of time, detection of a request by an electronic device to access one or more services provided by the media server 300).

In example step 502, the request may be analyzed. In this regard the media server 300 may analyze the request, including, for example, the image data to determine search object(s). The media server 300 may process the image data to determine metadata information associated with the image (e.g., date, time, location, duration, etc. (of a video image)). The media server 300 may analyze the graphical composition of an image, by for example, determining one or more distinct regions of the image. The media server 300 may determine search object(s) based on the metadata information, the image data, and/or the distinct regions.

In an example embodiment of the disclosure, the media server 300 may analyze the metadata information to determine search object(s). For example, the media server 300 may determine that the metadata information may indicate that the image was captured at a particular location, such as, for example, Location_A. The media server 300 may determine search object(s) that are, for example, associated with Location_A and/or with product(s) and/or service(s) provided by the media server 300. For example, the media server 300 may determine that one or more DMIs, for example, by Artist_A, are related to Location_A. The media server 300 may also determine, that for example, there are one or more concerts scheduled to take place in Location_A within a pre-determined amount of time of the request received in the example step 501. The search object(s) may comprise data and/or information regarding the DMIs (or the DMIs themselves) and/or data and/or information regarding the concerts determined in the example process.

In another example embodiment of the disclosure, the media server 300 may determine that the metadata information may indicate that the image was captured on a particular date, such as, for example, Dec. 12, 2012. The media server 300 may determine search object(s) that are, for example, associated with the Dec. 12, 2012 date and/or with product(s) and/or service(s) provided by the media server 300. For example, the media server 300 may determine that one or more DMIs, for example, by Artist_B are related to the Dec. 12, 2012 date (e.g., December is a month related to a genre of music by Artist_B or Artist_B was born or died on December 12). The search object(s) may comprise data and/or information regarding the DMIs (or the DMIs themselves) determined in the example process.

In an example embodiment of the disclosure, the media server 300 may determine that the image comprises, for example three (3) distinct regions: Region_1, Region_2, and Region_3. The media server 300 may determine search object(s) that are related to one or more of the distinct regions. The region determination analysis may comprise various image processing methods (e.g., image composition deviation, optical character recognition (OCR), facial recognition, visual search, etc.). For example, to determine approximate or definite boarders of image regions, the media server 300 may, for example, determine an image composition deviation between different parts of an image. In this regard, when the image composition of a particular part of an image deviates from an image composition of another particular part of the image by a predetermined value, the media server 300 may, for example, determine that each of the particular parts may belong to separate image regions.

In another example embodiment of the disclosure, the media server 300 may determine the example three (3) regions by, for example, performing an OCR. In this regard, the media server 300 may determine that a particular part of an image comprises text and may determine that that particular part constitutes a region. Depending on the relevant location of the determined text region within the image (and/or with respect to already determined and/or undetermined regions), the media server 300 may determine that the parts surrounding and/or bordering the determined text region comprise one or more separate regions of the image. For example, the media server 300 may determine that Region_1 is a text region and that Region_2 and Region_3 are each a graphical region.

In an example embodiment of the disclosure, the media server 300 may analyze each of the three (3) regions to determine search object(s). For example, the media server 300 may perform an OCR on Region_1 (e.g., a text region) to determine search object(s) relevant to products and/or services provided by the media server 300. For example, the media server 300 may determine that Region_1 comprise text corresponding to, for example, Artist_C (e.g., the text contains information related to Artist_C—the name of Artist_C, the name of an album by Artist_C, the name and/or other information relevant to a genre under which Artist_C is classified, etc.). The media server 300 may determine, for example, one or more DMIs corresponding to Artist_C (e.g., DMIs by Artist_C or similar artists). In another example, the media server 300 may perform a further graphical image analysis on Region_2 and Region_3 to determine additional search object(s). For example, the media server 300 may perform an image based search by comparing Region_ 2 and/or Region_3 to images of products and/or services provided by the media server 300. For example, the media server 300, based on the image comparison process, may determine that, for example, Region_2 comprises a picture of Artist_D and may determine search object(s) relevant to Artist_D.

In an example embodiment of the disclosure, the media server 300 may use any combination of the metadata information, the image data, and/or information and/or data relating to the distinct regions of the image and/or other criteria to determine search object(s). For example, the media server 300 may use the metadata information, such as, for example, Location_A and Region_1 information (as determined in the example process above) to determine that, for example, there is a concert by Artist_C in Location_A within a pre-determined amount of time from the time of the request in the example step 501.

In example step 503, a particular user associated with the electronic device from which the request was received in the example step 501 may be determined. In this regard, the media server 300 may initiate a search on a user registration database to determine a particular user associated with the electronic device. The media server 300 may determine user data associated with the particular user. The user data may include personal information about the particular user (e.g., age, gender, home location and/or other demographic information), electronic device information (e.g., name, type of the electronic device from which a request in the example step 501 was received and/or of any other electronic device that may be associated with the particular user) and/or information about a personal media library associated with the particular user. The user data may also include, for example, data related to a history of user interactions with product(s) and/or service(s) provided by the media server 300, such as, for example, a history of user responses to suggestion(s) and/or recommendation(s) from the media server 300 (e.g., whether the user purchased and/or interacted with the content of the suggestion(s) and/or recommendation(s), whether the user marked up or down a particular DMI suggested and/or recommended by the media server 300 etc.).

In example step 504, search interest(s) associated with the particular user may be determined. In this regard, the media server 300 may, for example, analyze the user data determined in the example step 503 to determine search interest(s).

In an example embodiment of the disclosure, the media server 300 may analyze the contents of the particular user's personal digital media library to determine digital content (e.g., one or more DMIs) that the user may be interested in. For example, because the particular user' personal digital media library may comprise relatively many DMIs by a particular artist, such as, for example, Artist_C, the media server 300 may determine that the particular user's interests include DMIs related to Artist_C, such as for example, DMIs by Artist_C, DMIs by artists categorized within the same and/or similar genre as Artist_C, etc. The media server 300 may determine one or more search interest(s) based on the particular user's interests.

In example step 505, suggestion(s) and/or recommendation(s) for the particular user may be determined. In this regard, the media server 300 may determine suggestion(s) and/or recommendation(s) based on, for example, the search object(s) as determined in the example step 502 and/or the search interest(s) as determined in the example step 504. The media server 300 may use selection logic to determine, for example, which of the search object(s) may be best suited for recommending to the particular user based on the search interest(s). For example, the media server 300 may compare particular search interest(s) as determined in the example step 504, such as, for example, DMIs by Artist_C (based on the contents of the particular user's library), with particular search object(s) as determined in the example step 502, such as, for example, DMIs by Artist_C (based on Region_1).

Furthermore, the media server 300 may determine that because, for example, the particular user's personal digital media library already includes many DMIs by Artist_C the suggestion(s) and/or recommendation(s) for the particular user may not include other DMIs by Artist_C but may instead include, for example, DMIs by artists thematically related to Artist_C (e.g., artists categorized under the same or similar genre). Also, the media server 300 may determine that a particular artist, for example, Artist_E has an upcoming concert in Location_A (determined as part of the metadata information in the example step 502) and that Artist_E is thematically related to Artist_C. Based on such example selection logic, the media server 300 may determine one or more DMIs by Artist_E and/or Artist_E's concert data and/or information to be included as part of the suggestion(s) and/or recommendation(s).

In another example embodiment of the disclosure, the media server 300 may determine that the suggestion(s) and/or recommendation(s) for the particular user may include DMIs by Artist_C, because for example the particular user's personal digital media library does not include any (or many) DMIs by Artist_C but, for example, includes DMIs by artist thematically related to Artist_C (e.g., artists categorized under the same or similar genre), if such a determination was made instead of the determination made in the example step 504.

In example step 506, recommendation data may be sent to the electronic device. The recommendation data may, for example, comprise the suggestion(s) and/or recommendation(s) as determined in the example step 505.

It is to be understood that when content(s) (e.g., DMI(s)) are sent, received, stored and/or processed as described herein, the contents may comprise the contents themselves (e.g., the actual digital media item(s) and/or files corresponding to the particular digital media content(s) being sent, received, stored and/or processed), pointers to the contents (e.g., identifies, IDs and/or pointers to entity/entities and/or item(s) in, for example a database and/or a storage location corresponding to the particular digital media content(s) being sent, received, stored and/or processed), text file(s) representative of the contents, list(s) of the contents and/or any other form that may allow a media server, such as for example, the media server 300, and/or an electronic device, such as, for example, the electronic device 200, to identify, determine and/or process the content(s) accordingly.

Other implementations may provide a computer readable medium and/or storage medium, and/or a machine readable medium and/or storage medium, having stored thereon, a machine code and/or a computer program having at least one code section executable by a machine and/or a computer, thereby causing the machine and/or computer to perform the steps as described herein for suggesting media content based on an image capture.

Accordingly, the present method and/or system may be realized in hardware, software, or a combination of hardware and software. The present method and/or system may be realized in a centralized fashion in at least one computing system, or in a distributed fashion where different elements are spread across several interconnected computing systems. Any kind of computing system or other system adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

The invention claimed is:

1. A method, comprising:
  in a server:
    receiving, from an electronic device, a request for recommendations based on an image capture, wherein the request comprises image data associated with the image capture;
    analyzing the request to determine one or more search objects;

determining a particular user associated with the electronic device;
determining one or more search interests, wherein each of the one or more search interests is associated with the particular user, with at least one of the one or more interests associated with the particular user being determined based upon contents of a personal digital media library associated with the particular user;
determining one or more custom recommendations suggesting a product or service for the particular user based on the one or more search objects and on the one or more search interests; and
sending, to the electronic device, recommendation data, wherein the recommendation data comprises the one or more custom recommendations.

2. The method of claim 1, wherein the one or more search objects comprises data indicative of a physical location associated with the image.

3. The method of claim 1, wherein the analyzing the request comprises performing optical character recognition (OCR).

4. The method of claim 1, wherein the analyzing the request comprises performing an image based search.

5. The method of claim 1, wherein each of the one or more search objects is associated with a product.

6. The method of claim 5, wherein the product is associated with a digital media item.

7. The method of claim 1, wherein the determining of the one or more search interests comprises analyzing a digital media library and wherein the digital media library is associated with the particular user.

8. The method of claim 1, comprising:
determining or receiving from the electronic device demographic data associated with the particular user;
wherein the determining of the one or more search interests comprises analyzing the demographic data.

9. A system comprising:
one or more processors, the one or more processors being operable to:
receive, from an electronic device, a request for recommendations based on an image capture, wherein the request comprises image data associated with the image capture;
analyze the request to determine one or more search objects;
determine a particular user associated with the electronic device;
determine one or more search interests, wherein each of the one or more search interests is associated with the particular user, with at least one of the one or more interests associated with the particular user being determined based upon contents of a personal digital media library associated with the particular user;
determine one or more custom recommendations suggesting a product or service for the particular user based on the one or more search objects and on the one or more search interests; and
send, to the electronic device, recommendation data, wherein the recommendation data comprises the one or more custom recommendations.

10. The system of claim 9, wherein the one or more search objects comprises data indicative of a physical location associated with the image.

11. The system of claim 9, wherein the analyzing the request comprises performing optical character recognition (OCR).

12. The system of claim 9, wherein the analyzing the request comprises performing an image based search.

13. The system of claim 9, wherein each of the one or more search objects is associated with a product.

14. The system of claim 13, wherein the product is associated with a digital media item.

15. The system of claim 9, wherein the determining of the one or more search interests comprises analyzing a digital media library and wherein the digital media library is associated with the particular user.

16. The system of claim 9, wherein the one or more processors is operable to:
determine or receive from the electronic device demographic data associated with the particular user;
wherein the determining of the one or more search interests comprises analyzing the demographic data.

* * * * *